Sept. 21, 1954     E. SENNA     2,689,483
MEANS FOR VARYING THE CIRCUMFERENCE OF WORKING FACES
Filed Jan. 18, 1952

*INVENTOR.*
Edward Senna
BY
*Attorney*

Patented Sept. 21, 1954

2,689,483

UNITED STATES PATENT OFFICE 2,689,483

MEANS FOR VARYING THE CIRCUM-FERENCE OF WORKING FACES

Edward Senna, Spokane, Wash.

Application January 18, 1952, Serial No. 267,128

2 Claims. (Cl. 74—230.16)

This invention relates to sheave wheels, pipe bending dies, pulleys and the like and more particularly is a means for selectively varying the circumference of an exposed working face in devices having circular working faces.

The principal object of the invention lies in the provision of multiple rings adapted to nest one within another to permit an operator to apply the desired circumferential working face to a central support.

Another object of the invention lies in the provision of a simple but effective method of securing the rings to each other to prevent their slipping axially or circumferentially with relation to each other.

Figure 1:
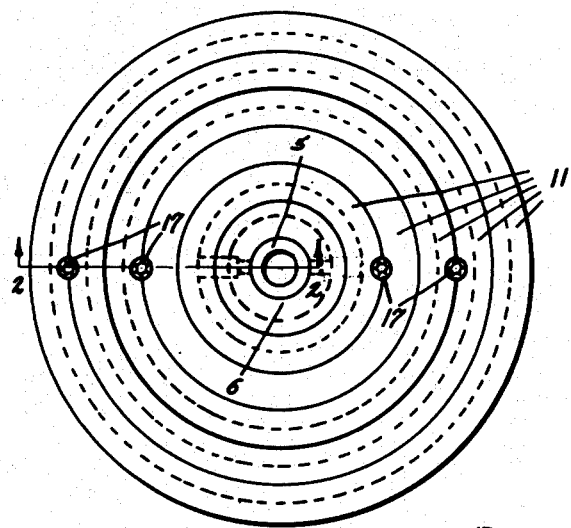
Figure 2:
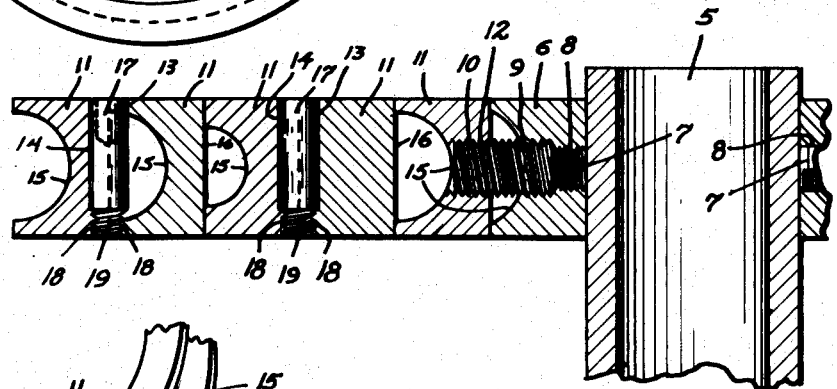
Figure 3:
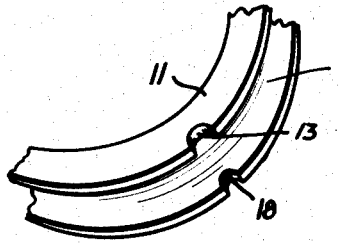
Figure 4:
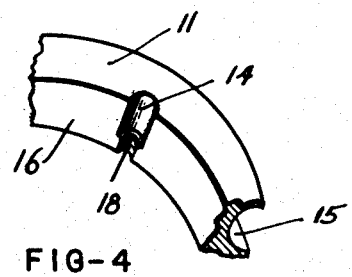

In the accompanying drawing, forming a part of this specification, and in which like numerals are employed to designate like parts, Figure 1 is a plan view of the device showing the rings nested one within another and the central ring secured to a support, Figure 2 is a transverse cross section as at line 2—2 of Figure 1, Figure 3 is a fragmentary perspective view showing the working face of a ring and its socket, and, Figure 4 is a fragmentary perspective view of a ring showing the vertical rear wall and its socket.

The invention is provided with a central support 5 which may be a powered shaft, idling shaft or stationary shaft as the case may require, and about this shaft the central ring 6 is positioned and if desired is secured thereto by means of set bolts 7 threaded into radially disposed tapped holes 8 formed in the body of ring 6 and adapted to be tightened down against the support 5 to lock the central ring against movement, relative to the support.

A socket 9, of greater diameter than hole 8, is formed in ring 6 and axially aligned with hole 8. The socket 9 is threaded to receive a stud bolt 10 which threadedly passes radially through socket 12 of the next successively larger one of rings 11 and into aligned socket 9. This is one method of securing the rings together when the rings are small and close to the axis thereof.

However, the larger rings require a more secure fastening against torsional strain in some uses, and I have provided this fastening by forming sockets 13 and 14 in the working faces or rims 15 of the rings 11 and also the vertical rear walls 16. Referring to Figure 2 of the drawing it will be seen that the working face or rim 15 of each ring may be shaped as desired for the work at hand by varying the radius of the groove or by providing other shaped faces such as a vertical face as indicated at 15 on the fourth ring section from the outer edge. The face may be of any other shape found desirable without departing from the spirit of the invention. These sockets 13 and 14 are each half round, and when aligned with each other are adapted to receive stud bolts 17. The lower reduced end of the sockets 13 and 14 are each threaded with companion threads 18 and receive the reduced threaded end 19 of stud bolts 17. When the sockets of adjoining rings 11 are aligned, they form a complete receptacle for stud bolts 17 which are threaded therein and thus secure the adjoining rings together.

Working faces or rims 15 may be selected to suit the individual requirements and thus form a highly adaptable device.

Having thus described my invention, I claim:

1. A device of the character described comprising nested concentric rings, one of said rings adapted to mount said device on a rotatable support, a working face on the outer peripheral edge of each ring, a plurality of axially parallel threaded sockets having semicylindrical portions in adjacent concentric rings and threaded stud bolts in the sockets whereby the adjacent rings are releasably secured together for selective application to vary the working face circumference.

2. A device of the character described comprising rings adapted to be nested one within another, an outer circumferential working edge face on each ring, companion stud bolt receiving aligned semi-cylindrical socket sections forming sockets in the adjoining rings and disposed parallel with the axis of said rings, a reduced threaded portion at one end of said sockets, and stud bolts each having a body fitting in said aligned sockets and having a reduced threaded end portion threadedly engaged in said threaded sockets, whereby the rings are releasably secured together to selectively vary the exposed working face.

References Cited in the file of this patent

UNITED STATES PATENTS

| Number | Name | Date |
|---|---|---|
| 411,364 | Wright | Sept. 17, 1889 |
| 596,246 | Pease | Dec. 28, 1897 |
| 607,615 | Chickering | July 19, 1898 |
| 1,371,212 | Adams et al. | Mar. 15, 1921 |
| 2,258,225 | Shores | Oct. 7, 1941 |
| 2,575,582 | Chamberlain | Nov. 20, 1951 |

FOREIGN PATENTS

| Number | Country | Date |
|---|---|---|
| 29,517 | Great Britain | Dec. 16, 1909 |
| 57,108 | Germany | Aug. 14, 1911 |